Dec. 2, 1958  A. W. MALL  2,862,533
SAW CHAIN
Filed Aug. 17, 1955  3 Sheets-Sheet 1
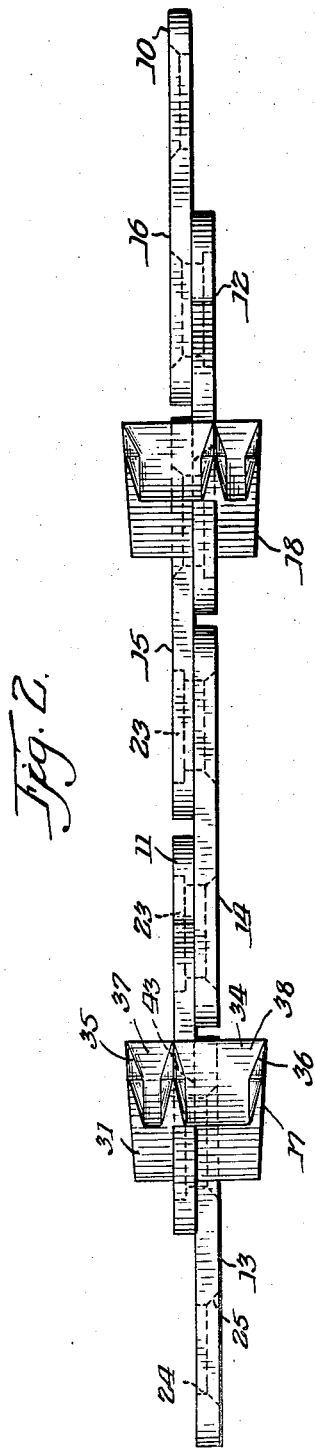
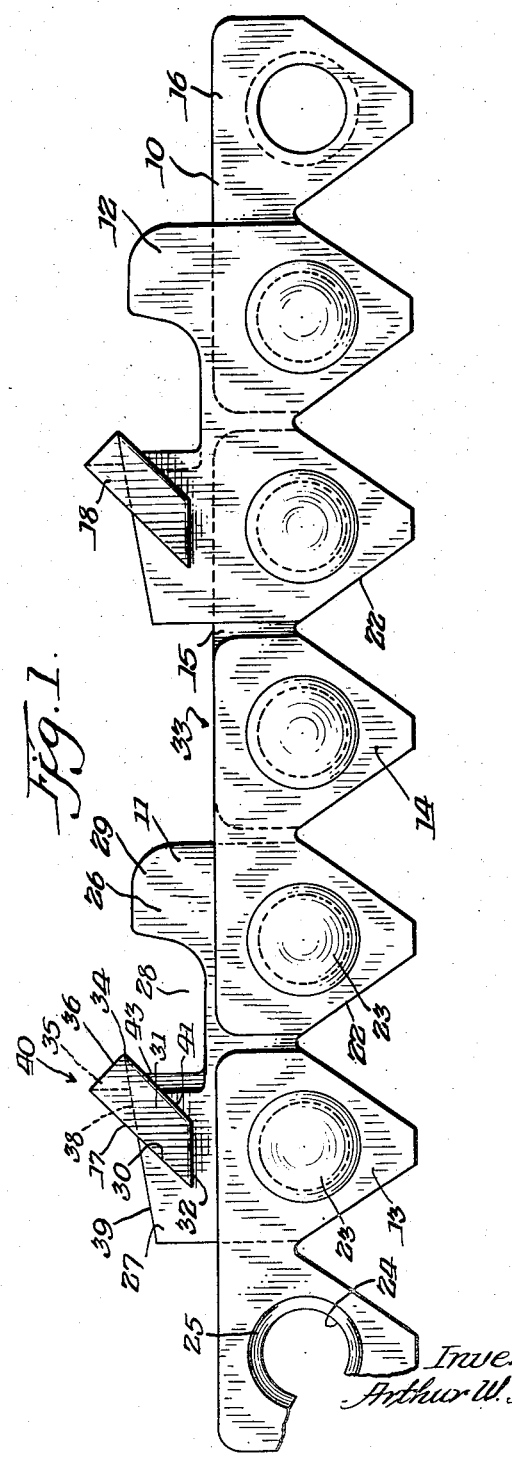
Inventor
Arthur W. Mall.
By John Bundock Atty.

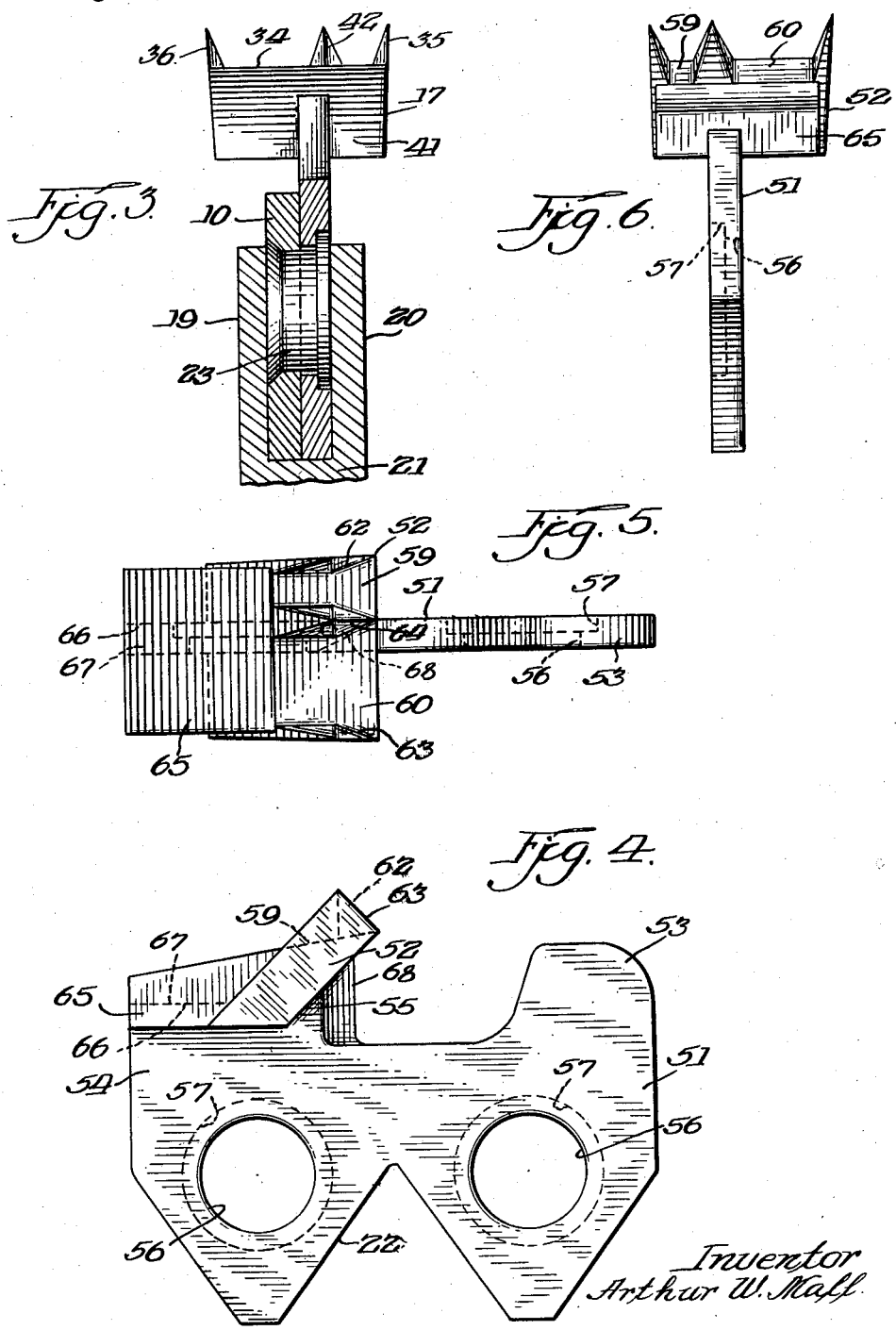

Dec. 2, 1958 A. W. MALL 2,862,533
SAW CHAIN
Filed Aug. 17, 1955 3 Sheets-Sheet 3
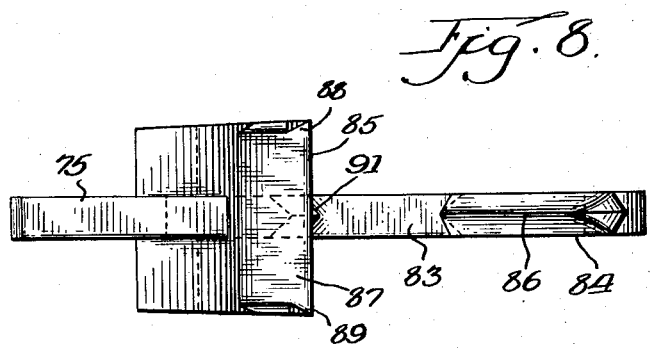
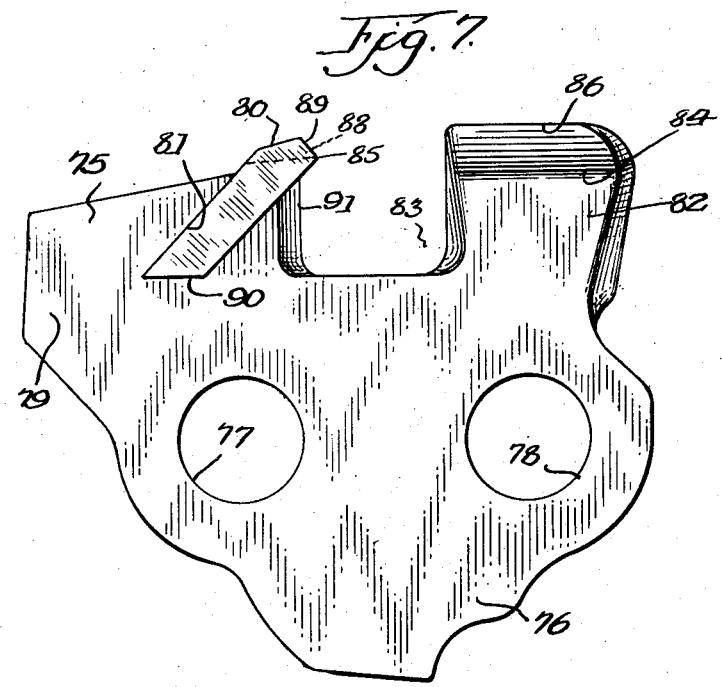
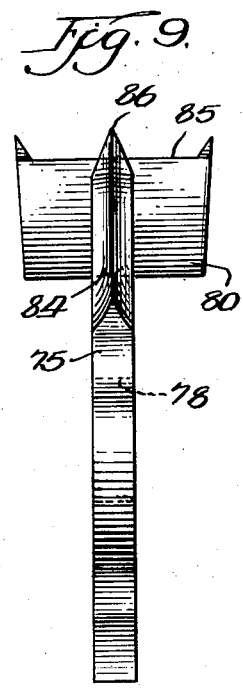
Inventor
Arthur W. Mall
By John Burdock Jr. Atty.

United States Patent Office 2,862,533
Patented Dec. 2, 1958

2,862,533

SAW CHAIN

Arthur W. Mall, Flossmoor, Ill., assignor, by mesne assignments, to Remington Arms Company, Inc., Bridgeport, Conn., a corporation of Delaware Application August 17, 1955, Serial No. 529,035

3 Claims. (Cl. 143—135)

This invention relates to a wood sawing chain and more particularly to a chain adapted to travel around the sprocket and guide bar of a power chain saw, having links pivotally connected together, and cutters providing kerf bottom cutting edges extending transversely of the chain the full width of the kerf and vertical slitting or slashing edges for cutting the sides of the kerf and for stabilizing the saw chain.

A principal object of this invention is to provide a saw chain employing a combination of transverse chisel edges and vertical slashing or slitting edges to form the kerf.

In a preferred form of the invention, the cutting edges are on carbide bits carried on links of the saw chain. Carbide has superior edge holding qualities thus providing cutting edges with long life, but being extremely brittle it is necessary to support the tooth adequately to withstand the rough usage encountered in the production cutting of timber.

Another object of this invention is to provide a saw chain link carrying a saw tooth on the rearward part of the link and a combination slitting saw tooth and gauge tooth on the forward part of the link. The slitting action serves the functions of reducing chip size and also stabilizing a saw chain equipped with such a tooth in the kerf, resulting in a smooth kerf, eliminating roaming or lateral sway of the saw chain and reducing wear on the guide bar around which the chain travels.

Other objects will appear from the following drawings in which:

Fig. 1 is a side elevation of a saw chain equipped with links constructed in accordance with the invention;

Fig. 2 is a top view of the saw chain shown in Fig. 1;

Fig. 3 is a view partially in section of the saw chain shown in Fig. 1 in a guide bar slot;

Fig. 4 is a side elevation of a saw chain link provided with a supported carbide bit;

Fig. 5 is a top view of the saw chain link shown in Fig. 4;

Fig. 6 is a rear view of the saw chain link shown in Fig. 4;

Fig. 7 is a side elevation of a modified form of saw chain link;

Fig. 8 is a top view of the saw chain link shown in Fig. 7;

Fig. 9 is a rear view of the saw chain link shown in Fig. 7.

A saw chain according to a preferred form of this invention is shown at 10 (Fig. 1) made up of a plurality of cutter links 11, 12 and connecting links 13, 14, 15 and 16, with saw teeth 17, 18 carried on the cutter links of the chain. For illustrative purposes, only one complete sequence of cutter links and connecting links is shown in Figs. 1 and 2 although it will be understood that in actual cutting the chain is formed in an endless length and is adapted to travel around a guide bar and sprocket, with a source of power connected to the sprocket for driving the chain. In Fig. 3, the chain 10 shown in Figs. 1 and 2, is depicted sliding between the rails 19, 20 of a guide bar 21.

The lower portions of both the connecting links and cutter links are shaped to conform to a sprocket used for driving the chain in the conventional manner, with deep notches 22 which fit about the sprocket teeth.

Rivets 23 which are finished flush with the sides of the link pivotally fasten together connecting links and cutter links. This is to enable the chain to slide within the rails 19, 20 of the guide bar 21 which serves the purpose of guiding the chain into the kerf and supporting the chain during the cutting operation.

The connecting links in the chain, of which link 13 is typical, are manufactured from strip steel and provided with rivet openings 24 countersunk at 25 in order to allow the rivet heads to be finished substantially flush with the outside of the link.

Next preceding a connecting link 13 in the saw chain 10 is found a cutter link 11 bearing a saw tooth 17. The cutter link 11 is also formed from strip steel, and has a forward part 26 and a rearward part 27 separated by a gullet 28. Supported on the forward part 26 of the link 11 is a depth gauge tooth 29, which in the embodiment of the invention illustrated is provided with a blunt top.

To support the saw tooth 17 on the cutter link 11, a slot 30 is formed in the rearward part of the link, into which a bit 31 is slid and subsequently fastened in place. The bit 31 may be of tool steel or of a high carbon steel depending upon the properties desired for the cutter, but in the preferred form of the invention illustrated in Figs. 1 and 2, a tool steel bit is used, adapted to be ground to a fine, keen cutting edge.

When fastened in place, the bit 31 lies directly in back of the depth gauge tooth 29, separated therefrom by the gullet 28, where the chips collect to be conveyed from the kerf during the sawing operation. Sawdust flows past the saw teeth to be conveyed from the kerf by other elements in the chain, collecting above the chain wherever space is provided. Particularly in long cuts, where the quantity of sawdust produced by the saw teeth is great, the sawdust packs in and about all the links flowing past the side of the chain and next to the guide bar itself against the side walls of the kerf.

To facilitate the free flow of sawdust, the lower end 32 of the saw tooth 17 is supported spaced above the top 33 of the chain. It may be readily observed that a certain amount of the shavings cut from the bottom and side of the kerf by the saw teeth flows below the bit to be deposited further back in the chain where it is conveyed from the kerf.

Saw teeth 17, 18, are identical but of left and right hand, and are arranged symmetrically in the chain. For convenience the cutting edges on saw tooth 17 (Figs. 2, 3) will be described, however, the description is equally as apt to saw tooth 18. The cutting action is performed by a horizontal cutting edge 34 extending the full width of the kerf, and vertical cutting edges 35, 36 for severing the fibers at the sides of the kerf. In a preferred form of the invention (Fig. 2) a vertical slashing edge is formed intermediately of the outer cutting edges 35, 36 to slit the shaving in two and also to stabilize the saw tooth in the kerf.

The cutting edges are produced by grinding the bit on the top to produce the flat surfaces 37, 38 which decline slightly toward the back of the tooth and merge with the top edge 39 of the rearward portion of the cutter link. A sharp edge 43 also is provided on the rearward part of the link to encourage entry of the saw tooth into the wood.

To form vertical cutting edges with long edge holding properties, the bit is ground first so that the front 40 of the bit is substantially at right angles to the underside 41 thereof. The flat surfaces 37, 38 are then ground, producing the horizontal cutting edge 34. Edges are formed at 35, 36 which lie at the very outer sides of the bit and at 42 which lies over the center part of the chain.

Carbide, a much harder, although more brittle material than tool steel, provides improved edge holding characteristics but because of its tendency to fracture must be adequately supported. Figs. 4–6 illustrate a saw tooth mounted on a cutter link 51 with a bit 52 of carbide. To limit the depth of cut taken by the cutting edge, the forward part of the cutter link is formed with a blunt depth gauge tooth 53, which during the operation of the chain including this cutter link, rides along the bottom of the kerf. On the rearward part 54 of the cutter link 51, is supported the carbide bit 52 which is held in a slot 55 cut in the body of the cutter link.

The cutter link 51 is also provided with openings 56 which are countersunk at 57 to receive rivets 58 to fasten successive cutter links and connecting links together in the manner of Figs. 1 and 2.

To provide horizontal and vertical cutting edges for severing the wood fibers along the sides and bottom of the kerf, the top of the bit 52 is ground in the manner described in connection with the saw tooth of Figs. 1 and 2, with flats formed at 59, 60. Vertical cutting edges 62, 63 at the outer sides of the bit are thus formed with a vertical slashing edge 64 for stabilizing the cutter and to split the wood shavings.

In order to insure adequate support of the carbide bit 52, a backing element 65 is provided fastened in place on the top 67 of the rearward part of the cutter link 51 and conforming to and fitting against the back of the bit 52. Backing element 65 is slotted at 66 so as to fit on the top of the rearward part of the cutter link, extending on both sides of the body of the blank a short distance below the top to enable the backing element to be more securely fastened in place.

The leading edge 68 of the rearward part of the cutter link 51 is sharpened to facilitate entry of the bit 52 into the wood at the bottom of the kerf and to improve the cutting action of the bit.

In Figs. 7, 8 and 9 a cutter link which may be employed in a saw chain is illustrated, this cutter link being particularly designed for use in a saw chain made up as shown in application Serial No. 228,441, now abandoned, Arthur W. Mall. In a chain constructed as described therein center spacer links provided with sprocket engaging tang portions are fastened together by connecting links arranged in pairs on both sides of the center spacer links found in the chain. Thus this chain is of a three-link thickness, with the pair of connecting links and the intermediately fastened center link, as contrasted with the two-link thickness of the saw chain of Fig. 1.

The center spacer link 78 is provided with a tang portion 76 shaped to fit about a sprocket used to drive the chain, and also with openings 77, 78 to receive rivets for fastening the pairs of connecting links to the center spacer link 75. On the rearward part 79 of the cutter link 75 is mounted a tool steel bit 80 which is fastened in place within a slot 81 cut in the rearward part of the link. On the forward part 82 of the cutter link 75, and spaced from the bit 80 by a gullet 83, is a sharp-edged combination slashing and gauge tooth 84. This tooth 84 serves the purpose of limiting the depth of bite taken by the horizontally disposed cutting edge 85 found on the bit 80 and furthermore splits the shaving cut by the horizontal cutting edge into two substantially equal parts. To perform this slitting function, the top of the tooth 82 is formed with a sharp edge 86, and this sharp edge continues over the front of the depth gauge tooth 84.

The bit 80 is sharpened by grinding a flat surface 87 on the top of the bit, leaving vertical cutting edges 88, 89 at the outer sides of the bit. The lower end 90 of the bit 80 is spaced a substantial distance above the rivet openings 77, 78 and thus will be spaced a considerable distance above the connecting links in the assembled chain.

To facilitate entry of the bit 80 into the wood of the kerf bottom, a sharp edge 91 is provided on the leading portion of the rearward part of the cutter link.

As has been described in connection with the embodiment of the invention illustrated in Figs. 4–6, a carbide bit may be substituted for the tool steel bit shown in Figs. 7–9 if provision for adequate support of the bit is made.

The invention has been described with reference to particular preferred embodiments and it is understood the details are merely illustrative and that the invention may be carried out in other ways without departing from the true spirit and scope of the appended claims.

I claim:

1. In a saw chain having links pivotally connected together, said links including cutter links separated by connecting links, each of said cutter links having forward and rearward parts projecting outwardly beyond said connecting links, a blunt depth gauge tooth on the forward part of each of said cutter links, and a saw tooth for defining the kerf comprising a flat bit carried on the rearward part of each of said cutter links behind said depth gauge tooth, said bit being declined toward the rear of said link but terminating at a spaced distance outwardly from the level of the nearest adjacent portions of said connecting links, said bits presenting a kerf bottom cutting edge on the fronts thereof extending transversely of the cutter link the full width of the kerf and kerf side cutting edges on opposite front corners of the bit angularly disposed relative to the cutting edge on the front of the bit.

2. In a saw chain having links pivotally connected together, some of said links being cutter links and having outwardly projecting forward and rearward parts, a saw tooth for defining the kerf comprising a bit carried on the rearward portion of each of said cutter links, said bits being declined toward the rear of said cutter links and extending transversely thereof the full width of the kerf, said bit being substantially rectangular in form and of uniform thickness, kerf bottom cutting edges and kerf side cutting edges presented by said bit, said bits being formed essentially of tungsten carbide, and supporting means backing the bit fastened on the rearward part of said cutter links, said supporting means comprising a brace carried on the back of said links and extending transversely substantially the width of said bits.

3. In a saw chain having links pivotally connected together, some of said links being cutter links and providing substantially flat bodies with outwardly projecting forward and rearward parts, the bodies of said links being provided with slots declined toward the rearward part of said links, a saw tooth for defining the kerf comprising a bit carried on each of said cutter links, said bits being supportingly received within said slots and extending transversely of the links the full width of the kerf, said bits being substantially rectangular in form and of uniform thickness, kerf bottom cutting edges and kerf side cutting edges presented by said bits, said bits being composed essentially of tungsten carbide, and supporting means backing said bits fastened on the rearward parts of said links, said supporting means being in addition to the support provided said bits by the portions of said cutter links surrounding said slots therein and comprising a brace carried on the back of said links and extending transversely substantially the width of said bits.

References Cited in the file of this patent

UNITED STATES PATENTS

| | | |
|---|---|---|
| 323,602 | Shipe | Aug. 4, 1885 |
| 1,483,387 | Serin | Feb. 12, 1924 |
| 2,372,534 | Victor | Mar. 27, 1945 |
| 2,508,784 | Cox | May 23, 1950 |
| 2,564,989 | Ohman | Aug. 21, 1951 |
| 2,664,120 | Hinkley | Dec. 29, 1953 |

FOREIGN PATENTS

| | | |
|---|---|---|
| 1,008,054 | France | Feb. 13, 1952 |